US007746825B2

(12) United States Patent
Olvera-Hernandez et al.

(10) Patent No.: US 7,746,825 B2
(45) Date of Patent: Jun. 29, 2010

(54) METHOD AND SYSTEM FOR INTEGRATING MEDIA INDEPENDENT HANDOVERS

(75) Inventors: Ulises Olvera-Hernandez, Kirkland (CA); Alan Gerald Carlton, Mineola, NY (US); Marian Rudolf, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 413 days.

(21) Appl. No.: 11/317,994

(22) Filed: Dec. 23, 2005

(65) Prior Publication Data

US 2006/0258355 A1  Nov. 16, 2006

Related U.S. Application Data

(60) Provisional application No. 60/681,259, filed on May 16, 2005.

(51) Int. Cl.
*H04W 4/00* (2009.01)
(52) U.S. Cl. .................. 370/331; 370/332; 370/333; 370/334; 455/436; 455/437; 455/438; 455/439; 455/440; 455/441; 455/442
(58) Field of Classification Search .......... 455/436, 455/437, 438, 439, 553.1, 440, 441, 442; 370/328, 278, 331, 332, 333, 334
See application file for complete search history.

(56) References Cited

U.S. PATENT DOCUMENTS

| 5,561,844 | A | 10/1996 | Jayapalan et al. |
| 5,737,703 | A | 4/1998 | Byrne |
| 5,889,816 | A | 3/1999 | Agrawal et al. |
| 5,991,626 | A | 11/1999 | Hinz et al. |
| 6,023,461 | A | 2/2000 | Raychaudhuri et al. |
| 6,385,451 | B1 | 5/2002 | Kalliokulju et al. |
| 6,424,639 | B1 | 7/2002 | Lioy et al. |
| 6,463,281 | B1 | 10/2002 | Norin et al. |

(Continued)

FOREIGN PATENT DOCUMENTS

AU   2002/313192   12/2003

(Continued)

OTHER PUBLICATIONS

IEEE P802.21/D00.03 "Draft IEEE Standard for Local and Metropolitan Area Networks: Media Independent Handover Services." Oct. 2005.

(Continued)

*Primary Examiner*—Dwayne Bost
*Assistant Examiner*—Pierre-Louis Desir
(74) *Attorney, Agent, or Firm*—Volpe and Koenig, P.C.

(57) ABSTRACT

A method and system for integrating media independent handover (MIH) under IEEE 802.21 and unlicensed mobile access (UMA) are disclosed. A public land mobile network (PLMN) and an unlicensed mobile access network (UMAN) are concurrently deployed. UMA is supported such that a multi-mode wireless transmit/receive unit (WTRU) may access the UMAN to receive PLMN services through the UMAN. MIH entities are included both in the WTRU and the UMAN and the MIH entity of the WTRU monitors handover events and information and generates a handover trigger for handover between the PLMN and the UMAN. The MIH entity in the UMAN interacts with the MIH entity of the WTRU to report a remote event, handover information and command.

25 Claims, 8 Drawing Sheets

U.S. PATENT DOCUMENTS

| | | | |
|---|---|---|---|
| 6,526,034 | B1 | 2/2003 | Gorsuch |
| 6,546,425 | B1 | 4/2003 | Hanson et al. |
| 6,577,868 | B1 | 6/2003 | Vialen et al. |
| 6,587,680 | B1 | 7/2003 | Ala-Laurila et al. |
| 6,651,105 | B1 | 11/2003 | Bhagwat et al. |
| 6,771,962 | B2 | 8/2004 | Saifullah et al. |
| 6,775,533 | B2 | 8/2004 | Kakani et al. |
| 6,804,222 | B1 | 10/2004 | Lin et al. |
| 6,816,730 | B2 | 11/2004 | Davies et al. |
| 6,826,406 | B1 | 11/2004 | Vialen et al. |
| 6,868,256 | B2 | 3/2005 | Dooley et al. |
| 6,879,568 | B1 | 4/2005 | Xu et al. |
| 6,912,389 | B2 | 6/2005 | Bright et al. |
| 6,985,465 | B2 | 1/2006 | Cervello et al. |
| 6,993,335 | B2 | 1/2006 | Natarajan et al. |
| 7,016,325 | B2 | 3/2006 | Beasley et al. |
| 7,031,280 | B2 | 4/2006 | Segal |
| 7,031,341 | B2 | 4/2006 | Yu |
| 7,046,647 | B2 | 5/2006 | Oba et al. |
| 7,047,036 | B2 | 5/2006 | Shaheen et al. |
| 7,106,714 | B2 | 9/2006 | Spear et al. |
| 2001/0009853 | A1 | 7/2001 | Arimitsu |
| 2002/0060995 | A1 | 5/2002 | Cervello et al. |
| 2002/0068570 | A1 | 6/2002 | Abrol et al. |
| 2002/0072382 | A1 | 6/2002 | Fong et al. |
| 2002/0131386 | A1 | 9/2002 | Gwon |
| 2002/0147008 | A1 | 10/2002 | Kallio |
| 2002/0173338 | A1 | 11/2002 | Neumann et al. |
| 2002/0188723 | A1 | 12/2002 | Choi et al. |
| 2003/0007490 | A1 | 1/2003 | Yi et al. |
| 2003/0117978 | A1 | 6/2003 | Haddad |
| 2003/0118015 | A1 | 6/2003 | Gunnersson et al. |
| 2003/0133421 | A1 | 7/2003 | Sundar et al. |
| 2003/0169774 | A1 | 9/2003 | Del Prado Pavon et al. |
| 2003/0193911 | A1 | 10/2003 | Zhao et al. |
| 2003/0224814 | A1 | 12/2003 | Qu et al. |
| 2004/0013102 | A1 | 1/2004 | Fong et al. |
| 2004/0029587 | A1 | 2/2004 | Hulkkonen et al. |
| 2004/0102194 | A1 | 5/2004 | Naghian et al. |
| 2004/0114553 | A1* | 6/2004 | Jiang et al. ............... 370/328 |
| 2004/0116120 | A1 | 6/2004 | Gallagher et al. |
| 2004/0127208 | A1* | 7/2004 | Nair et al. ............... 455/420 |
| 2004/0137901 | A1 | 7/2004 | Hamasaki et al. |
| 2004/0137902 | A1 | 7/2004 | Chaskar et al. |
| 2004/0147223 | A1 | 7/2004 | Cho |
| 2004/0147262 | A1 | 7/2004 | Lescuyer et al. |
| 2004/0156347 | A1 | 8/2004 | Kim |
| 2004/0165563 | A1 | 8/2004 | Hsu et al. |
| 2004/0165594 | A1 | 8/2004 | Faccin et al. |
| 2004/0205158 | A1 | 10/2004 | Hsu |
| 2004/0208144 | A1 | 10/2004 | Vinayakray-Jani |
| 2004/0240411 | A1 | 12/2004 | Suzuki |
| 2004/0248615 | A1 | 12/2004 | Purkayastha et al. |
| 2005/0018637 | A1 | 1/2005 | Karoubalis et al. |
| 2005/0157673 | A1 | 7/2005 | Verma et al. |
| 2005/0163078 | A1 | 7/2005 | Oba et al. |
| 2005/0165917 | A1 | 7/2005 | Le et al. |
| 2005/0185619 | A1 | 8/2005 | Niemela et al. |
| 2005/0201330 | A1 | 9/2005 | Park et al. |
| 2005/0243755 | A1 | 11/2005 | Stephens |
| 2005/0249161 | A1 | 11/2005 | Carlton |
| 2005/0266880 | A1 | 12/2005 | Gupta et al. |
| 2005/0276240 | A1 | 12/2005 | Gupta et al. |
| 2006/0025169 | A1 | 2/2006 | Maciocco et al. |
| 2006/0092864 | A1* | 5/2006 | Gupta et al. ............... 370/278 |
| 2006/0092890 | A1 | 5/2006 | Gupta et al. |
| 2006/0104292 | A1 | 5/2006 | Gupta et al. |
| 2006/0140150 | A1 | 6/2006 | Olvera-Hernandez et al. |
| 2006/0187858 | A1* | 8/2006 | Kenichi et al. ............... 370/254 |
| 2006/0211448 | A1* | 9/2006 | Reiss et al. ............... 455/553.1 |
| 2006/0221899 | A1* | 10/2006 | Feder et al. ............... 370/331 |

FOREIGN PATENT DOCUMENTS

| | | |
|---|---|---|
| EP | 1349413 A1 | 10/2003 |
| EP | 1435748 A1 | 7/2004 |
| WO | 99/09688 | 2/1999 |
| WO | 1999/09688 | 2/1999 |
| WO | 03/047296 | 6/2003 |
| WO | 2003/047296 | 6/2003 |
| WO | 2004/014027 | 2/2004 |
| WO | 2004/066707 | 8/2004 |
| WO | 2004/077747 | 9/2004 |
| WO | 2005/057968 | 6/2005 |
| WO | 2005/107297 | 11/2005 |

OTHER PUBLICATIONS

IEEE P802.21/D00.04 "Draft IEEE Standard for Local and Metropolitan Area Networks: Media Independent Handover Services." Dec. 2005.

Kwak, Joe. "RRM Study Group: Big Picture Issues." Sep. 10, 2002. IEEE Submission, Document: IEEE 802.11-557r0.

Kwak, Joe. "RRM Study Group: Big Picture Issues." Sep. 10, 2002. IEEE Submission, Document: IEEE 802.11-557r1.

Paine, Richard. "Radio Resource Measurement Requirements and Issues." Oct. 19, 2002. IEEE Submission, Document: IEEE 802.11-02/508r10.

Kwak, Joe. "WLAN Handoff Scenarios: Example Handoffs with RRM Measurements and Network Assistance." Mar. 2003. IEEE Submission, Document: IEEE 802.11-03/225r0.

Gupta, Vivek. "IEEE P802.21 Media Independent Handover Service Draft Technical Requirements." Sep. 2004.

Sachs et al. "IEEE 802.21 Media Independent Handover—Generic Link Layer Concept." IEEE Submission, Sep. 9, 2004.

Paine, Richard. "Radio Resource Measurement Issues." Jan. 16, 2003. IEEE Submission, Document: IEEE 802.11-03/134r0.

Johnston, David. "IEEE 802 Handoff Executive Committee Study Group." May 2003. 802 Handoff ECSG Minutes.

Johnston, David. "802 Handoff Presentation to WNG." Jul. 2003. 00-03-0022-00-0000 Handoff WNG Presentation r3.

Williams, Michael Glenn. IEEE P802 Wired and Wireless LANs Handoff: Tentative Minutes of the IEEE P802 Handoff Executive Committe Study Group. Jul. 22, 2003. IEEE 802.11-03/319r0-0023.

Williams, Michael Glenn. IEEE P802 Wired and Wireless LANs Handoff: Tentative Minutes of the IEEE P802 Handoff Executive Committee Study Group. Jul. 24, 2003. IEEE 802.11-03/319r000-03-0028-00-0000.

Johnston, David. "802 Handoff ECSG EC Closing Report." Jul. 2003. IEEE 00-03-0029-04-0000 802 Handoff EC Closing Report.

Williams, Michael Glenn. IEEE P802 Wired and Wired and Wireless LANs Handoff: Tentative Minutes of the IEEE P802 Handoff Executive Committee Study Group. Sep. 8, 2003. IEEE 00-03-0032-00-0000.

Paine, Richard. "Radio Resource Measurement: 802 Handoff Measurement Considerations." Mar. 2003. IEEE 802.11-03/125r4.

Hong, Cheng. "3GPP WLAN Interworking update." Mar. 16, 2004. IEEE 802.11-04/254r0.

Park, Soohong Daniel. "Access Router Identifier (ARID) for supporting L3 mobility." Jul. 2004. IEEE 802.11-04/710r0.

Gupta, Vivek. "Global Network Neighborhood," May 2004. IEEE 802.21.

Gupta, Vivek. "Steps in Handoffs and Use Cases." May 2004. IEEE 802.21.

Park, Soohong Daniel. "Awareness of the handover to be distinguished from a L2 or L3." Mar. 2004. 21-04-0002-00-0000-awareness handover L2$L3.ppt.

Johnston, David. "802.21, L2 Triggers A Strawman Proposal." Mar. 2004. 802.21 IETF Mobopts r1.

Shyy, Dong-Jye. "IEEE P802.21 Media Independent Handover Service: Draft Technical Requirements." Mar. 18, 2004. IEEE802.21-04/00xx-00.

Williams, Michael Glenn. "IEEE P802 Wired and Wireless LANs Handoff: Tentative Minutes of the IEEE P802 Handoff Executive Committee Study Group." Jan. 13, 2004. 00-04-00XX-00-0000.
Williams, Michael Glenn. "IEEE P802 Wired and Wireless LANs Handoff: Tentative Minutes of the IEEE P802 Handoff Executive Committee Study Group." Jan. 14, 2004. 00-04-00XX-00-0000.
Williams, Michael Glenn. "IEEE P802 Wired and Wireless LANs Handoff: Tentative Minutes of the IEEE P802.21 Working Group." Mar. 18, 2004. 00-04-00XX-00-0000.
Gupta, Vivek. "Global Network Neighborhood." May 2004. IEEE 802.21.
Gupta, Vivek. "Steps in Handoffs and Use Cases." May 2004. IEEE 802.21.
Gupta, Vivek. IEEE P802.21 Media Independent Handover Mechanisms: Teleconference Meeting Minutes. Jun. 29, 2004. 21-04-0073-00-0000.
Gupta, Vivek. "IEEE P802.21 Media Independent Handover Service Draft Technical Requirements." Jul. 12, 2004. 21-04-0087-00-0000.
Faccin, Stefano M. "IEEE 802.21 Media Independent Handover." Jan. 10, 2004. 21-04-0169-03-0000.
"IEEE 802.21 MIHO: Media Independent Handover Functions and Services Specification." Mar. 14, 2004.
"IEEE 802.21 MIHO: Media Independent Handover Functions and Services Specification." Mar. 14, 2004. 21-05-0253-01-0000.
"Information technology—Telecommunications and information exchange between systems—Local and metropolitan area networks—Specific requirements—Part 11: Wireless LAN Medium Access Control (MAC) and Physical Layer (PHY) Specifications." Jun. 12, 2003. ANSI/IEEE Std 802.11, 1999 Edition (R2003).
Park, Soohong Daniel. "Awareness of the handover to be distinguished from a L2 or L3." Mar. 2004. IEEE P802.21 Handoff.
Johnston, David. "802.21 L2 Services for Handover Optimization." Mar. 2004. 802.21 IETF DNA r1.
Johnston, David. "802.21, L2 Triggers a Strawman Proposal." Mar. 2004. 802.21 IETF Mobopts r1.
Liu, Xiaoyu. Interaction between L2 and Upper Layers in IEEE 802.21. Mar. 4, 2004. 802.21 L2 Upper Layer Interaction r.
Johnston, David. "Architectural Elements of an 802 Handoff Solution." May 2003. 802 Handoff Archtecture Elements r1.
Johnston, David. "802 Handoff Call for Interest—An Expression of Interest." Mar. 2003. IEEE 802-03/xxxr1.
Williams, Michael Glenn. "IEEE P802 Wired and Wireless LANs Handoff: Tentative Minutes of the IEEE P802 Handoff Executive Committee Study Group." Nov. 10, 2003. 00-03-00XX-00-0000.
Williams, Michael Glenn. "IEEE P802 Wired and Wireless LANs Handoff: Tentative Minutes of the IEEE P802.21 Working Group." Mar. 16, 2004. 00-04-00XX-00-0000.
Johnston, David. "Handoff Scope Discussion Points." May 2003. 802 Handoff Scope Discussion.
Johnston, David. "Improved Stack Diagram" Mar. 12, 2003. IEEE C802.16REVd-04/XX.
Aboba, Bernard. "A Model for Context Transfer in IEEE 802." Apr. 6, 2002.
Arbaugh, William A. "Experimental Handoff Extension to Radius." Apr. 23, 2003.
Wu, Gang. "Fast handoff for Mobile IP and Link Layer Triggers." May 2003. P802-Handoff-03-xxxr0-ECSG.
Gupta, Vivek. "IEEE 802.21: A Generalized Model for Link Layer Triggers." Mar. 1, 2004.
Johnston, David. "802 Handoff ECSG EC Opening Plenary Report." Nov. 2003. 802 Handoff EC Opening Plenary Report r2.
Lin, Huai-An (Paul). "Handoff for Multi-interfaced 802 Mobile Devices." May 2003. IEEE P802 Handoff ECSG.
Lin, Huai-An (Paul). "IEEE P802 Handoff ECSG: Handoff for Multi-interfaced 802 Mobile Devices." May 12, 2003.
Kwak, Joe. "Handoff Functional Elements: An analysis of typical mobile systems." Nov. 11, 2002.
Tan, TK. "Wireless Interworking Group." Nov. 11, 2002, IEEE 802.11-xxx.
Natarajan, Nat. "Support of Layer 2 Triggers for Faster Handoffs." Nov. 10, 2003. IEEE P802.20-03/95.
Johnston, David. "IEEE 802 Handoff ECSG L2 Triggers." Jan. 2004. L2 Triggers dj r1.
Rajkumar, Ajay. "Mobile-Initiated Handoff Amongst Disparate WLAN and Cellular Systems." May 13, 2003.
Williams, Michael Glenn. "Media Independent Handover: Use Cases and Architecture Discussion Stimulus." Jan. 2004. IEEE 802.21.
"Draft Supplement to Standard for Telecommunications and Information Exchange Between Systems—LAN/MAN Specific Requirements—Part 11: Wireless Medium Access Control (MAC) and physical layer (PHY) specifications: Medium Access Control (MAC) Enhancements for Quality of Service (QoS)." May 2002. IEEE Std 802.11e/D3.0.
Lin, Paul. "Proposed Problem and Scope Statements for Handoff ECSG." May 2003. IEEE P802 Handoff ECSG.
Das, Kaustubh. "Scope and Proposed Work Items for the Handoff Group." May 2003. IEEE P802 Handoff ECSG.
Das, Kaustubh. "Scope and Proposed Work Items for the Handoff Group." May 2003. IEEE P802 Handoff ECSG.
Gupta, Vivek. "Steps in L2 and L3 Handoffs." Jan. 2004. IEE P802 Handoff ECSG.
Arbaugh, William A. "Experimental Handoff Extension of RADIUS." Apr. 23, 2003.
Marks, Roger. "Handoff Mechanisms and their Role in IEEE 802 Wireless Standards." Oct. 9, 2002. IEEE T802.16-02/03.
Lee, Young J. "IEEE P802.11 Wireless LANs: The Strategy for interworking between WLAN and cdma2000." Nov. 10, 2003. IEEE 802.11-00/xxx.
Lee, Young J. "An Strategy for interworking between WLAN and cdma2000." Nov. 2003. IEEE 802.11-00/xxx.
Shyy, Dong-Jye. "IEEE 802.21 WG—Suggested Architectures for Different Handover Scenarios." Mar. 2004. IEEE 802.21-04/xxxr0.
Johnston, David. "802.21 L2.5 Model." Mar. 2004. 802.21 L2.5 Option r1.
Gupta, Vivek. "IEEE P802.21 Media Independent Handover Service Draft Technical Requirements." Aug. 17, 2004.
Gupta, Vivek. "IEEE P802.21 Media Independent Handover Service Draft Technical Requirements." Sep. 21, 2004. 21-04-0087-12-0000.
Gupta, Vivek. "IEEE P802.21 Media Independent Handover." Jan. 18, 2005. 21-05-0168-02-0000-MIH.
"3$^{rd}$ Generation Partnership Project; Technical Specification Group Services and Systems Aspects; Network architecture (Release 6)." 3GPP TS 23.002 V6.5.0 (Jun. 2004).
"3$^{rd}$ Generation Partnership Project; Technical Specification Group Services and Systems Aspects; General Packet Radio Service (GPRS); Service description; State 2 (Release 5)." 3GPP TS 23.060 V5.9.0 (Sep. 2004).
"3$^{rd}$ Generation Partnership Project; Technical Specification Group Services and Systems Aspects; 3GPP system to Wireless Local Area Network (WLAN) interworking; System description (Release 6)." 3GPP TS 23.234 V6.1.0 (Jun. 2004).
"3$^{rd}$ Generation Partnership Project; Technical Specification Group Services and Systems Aspects; 3GPP system to Wireless Local Area Network (WLAN) interworking; System description (Release 6)." 3GPP TS 23.234 V6.2.0 (Sep. 2004).
"3$^{rd}$ Generation Partnership Project; Technical Specification Group GSM/EDGE Radio Access Network; Feasibility Study on generic access to A/Gb interface (Release 6)." 3GPP TR 43.901 V6.0.0 (Aug. 2004).
McCann, P. "Mobile IPv6 Fast Handovers for 802.11 Networks." Jul. 2004.
Soliman et al. "Hierarchical Mobile IPv6 mobility management (HMIPv6)." Originally Published Jun. 15, 2004; Republished Dec. 2004.
Malki, El. K. "Low Latency Handoffs in Mobile IPv4." Jun. 2004.
Dommety et al. "Mobile IP Vendor/Organization-Specific Extension." Apr. 2001.
Koodli, R. "Fast Handovers for Mobile IPv6." Originally Published Jun. 2004; Republished Jul. 2005.
"Unlicensed Mobile Access (UMA); User Perspective (Stage 1)." UMA User Perspective (Stage 1) R1.0.0 (Sep. 1, 2004).
"Unlicensed Mobile Access (UMA); Architecture (Stage 2)." UMA Architecture (Stage 2) R1.0.0 (Sep. 1, 2004).
"Unlicensed Mobile Access (UMA); Protocols (Stage 3)." UMA Protocols(Stage 3) R1.0.0 (Sep. 1, 2004).

Wang, Xin Gang et al. "Towards Providing QoS for Integrated Cellular and WLAN Networks." 2003.

Wu, John Chiung-Shien et al. "Intelligent Handoff for Mobile Wireless Internet." 2001.

"IEEE P801.21/D00.01 Draft IEEE Standard for Local and Metropolitan Area Networks: Media Independent Handover Services." IEEE P801.21™/D00.01, Jul. 2005.

"Draft Amendment to Standard for Information Technology—Telecommunications and Information Exchange Between Systems—LAN/MAN Specific Requirements—Part 11: Wireless Medium Access Control (MAC) and physical layer (PHY) specifications—Amendment 7: Radio Resource Measurement." IEEE P802.11k/D1.0, Jul. 2004.

"Draft Amendment to Standard for Information Technology—Telecommunications and Information Exchange Between Systems—LAN/MAN Specific Requirements—Part 11: Wireless Medium Access Control (MAC) and physical layer (PHY) specifications—Amendment 9: Radio Resource Measurement." IEEE P802.11k/D3.0, Oct. 2005.

"802.16™ IEEE Standard for Local and metropolitan area networks—Part 16: Air Interface for Fixed Broadband Wireless Access Systems." IEEE Std 802.16™-2004. Oct. 1, 2004.

Kwak, Joe. "RRM Study Group: Big Picture Issues." Sep. 10, 2002. IEEE Submission, Document: IEEE 802.11-557r0.

Kwak, Joe. "RRM Study Group: Big Picture Issues." Sep. 10, 2002. IEEE Submission, Document: IEEE 802.11-557r1.

Sachs et al. "IEEE 802.21 Media Independent Handover—Generic Link Layer Concept." IEEE Submission, Sep. 9, 2004.

Johnston, David. "IEEE 802 Handoff Executive Committee Study Group." May 2003. 802 Handoff ECSG Minutes.

Johnston, David. "802 Handoff Presentation to WNG." Jul. 2003. 00-03-0022-00-0000 Handoff WNG Presentation r3.

Williams, Michael Glenn. IEEE P802 Wired and Wireless LANs Handoff: Tentative Minutes of the IEEE P802 Handoff Executive Committee Study Group. Sep. 8, 2003. IEEE 00-03-0032-00-0000.

Paine, Richard. "Radio Resource Measurement: 802 Handoff Measurement Considerations." Mar. 2003. IEEE 802.11-03/125r4.

Hong, Cheng. "3GPP WLAN Interworking update." Mar. 16, 2004. IEEE 802.11-04/254r0.

Park, Soohong Daniel. "Access Router Identifier (ARID) for supporting L3 mobility." Jul. 2004. IEEE 802.11-04/710r0.

Johnston, David. "802.21, L2 Triggers a Strawman Proposal." Mar. 2004. 802.21 IETF Mobopts r1.

Williams, Michael Glenn. "IEEE P802 Wired and Wireless LANs Handoff: Tentative Minutes of the IEEE P802 Handoff Executive Committee Study Group." Jan. 13, 2004. 00-04-00XX-00-0000.

Williams, Michael Glenn. "IEEE P802 Wired and Wireless LANs Handoff: Tentative Minutes of the IEEE P802.21 Working Group." Mar. 18, 2004. 00-04-00XX-00-0000.

Williams, Michael Glenn. "IEEE P802 Wired and Wireless LANs Handoff: Tentative Minutes of the IEEE P802.21 Working Group." Mar. 16, 2004. 00-04-00XX-00-0000.

Tan, TK. "Wireless Interworking Group." Nov. 11, 2002. IEEE 802.11-xxx.

Williams, Michael Glenn. "Media Independent Handover: Use Cases and Architecture Discussion Stimulus." Jan. 2004. IEEE 802.21.

Johnston, David. "802.21 L2.5 Model." Mar. 2004. 802.21 L2.5 Option r1.

"Unlicensed Mobile Access (UMA); User Perspective (Stage 1)." UMA User Perspective (Stage 1) R1.0.0 (Sep. 1, 2004).

"Unlicensed Mobile Access (UMA); Architecture (Stage 2)." UMA Architecture (Stage 2) R1.0.0 (Sep. 1, 2004).

"Unlicensed Mobile Access (UMA); Protocols (Stage 3)." UMA Protocols(Stage 3) R1.0.0 (Sep. 1, 2004).

Wang, Xin Gang et al. "Towards Providing QoS for Integrated Cellular and WLAN Networks." 2003.

Wu, John Chiung-Shien et al. "Intelligent Handoff for Mobile Wireless Internet." 2001.

"IEEE P801.21/D00.01 Draft IEEE Standard for Local and Metropolitan Area Networks: Media Independent Handover Services." IEEE P801.21™/D00.01, Jul. 2005.

"Draft Amendment to Standard for Information Technology—Telecommunications and Information Exchange Between Systems—LAN/MAN Specific Requirements—Part 11: Wireless Medium Access Control (MAC) and physical layer (PHY) specifications—Amendment 7: Radio Resource Measurement." IEEE P802.11k/D1.0, Jul. 2004.

"Draft Amendment to Standard for Information Technology—Telecommunications and Information Exchange Between Systems—LAN/MAN Specific Requirements—Part 11: Wireless Medium Access Control (MAC) and physical layer (PHY) specifications—Amendment 9: Radio Resource Measurement." IEEE P802.11 k/D3.0, Oct. 2005.

"802.16™ IEEE Standard for Local and metropolitan area networks—Part 16: Air Interface for Fixed Broadband Wireless Access Systems." IEEE Std 802.16™-2004. Oct. 1, 2004.

IEEE P802.21/D00.03 "Draft IEEE Standard for Local and Metropolitan Area Networks: Media Independent Handover Services," Dec. 2005.

IEEE P802.21/D00.04 "Draft IEEE Standard for Local and Metropolitan Area Networks: Media Independent Handover Services," Dec. 2005.

Kwak, Joe. "RRM Study Group: Big Picture Issues." Sep. 10, 2002. IEEE Submission, Document: IEEE 802.11-557r0.

Kwak, Joe. "RRM Study Group: Big Picture Issues." Sep. 10, 2002. IEEE Submission, Document: IEEE 802.11-557r1.

Paine, Richard. "Radio Resource Measurement Requirements and Issues." Oct. 19, 2002. IEEE Submission, Document: IEEE 802.11-02/50800.

Kwak, Joe. "WLAN Handoff Scenarios: Example Handoffs with RRM Measurements and Network Assistance." Mar. 2003. IEEE Submission, Document: IEEE 802.11-03/225r0.

Gupta, Vivek. "IEEE P802.21 Media Independent Handover Service Draft Technical Requirements." Sep. 2004.

Sachs et al. "IEEE 802.21 Media Independent Handover —Generic Link Layer Concept." IEEE Submission, Sep. 9, 2004.

Paine, Richard. "Radio Resource Measurement Issues." Jan. 16, 2003. IEEE Submission, Document: IEEE 802.11-03/134r0.

Johnston, David. "IEEE 802 Handoff Executive Committee Study Group." May 2003. 802 Handoff ECSG Minutes.

Johnston, David. "802 Handoff Presentation to WNG." Jul. 2003. 00-03-0022-00-0000 Handoff WNG Presentation r3.

Williams, Michael Glenn. IEEE P802 Wired and Wireless LANs Handoff: Tentative Minutes of the IEEE P802 Handoff Executive Committee Study Group. Jul. 22, 2003. IEEE 802.11-03/319r0-0023.

Williams, Michael Glenn. IEEE P802 Wired and Wireless LANs Handoff: Tentative Minutes of the IEEE P802 Handoff Executive Committee Study Group. Jul. 24, 2003. IEEE 802.11-03/319r000-3-0028-00-0000.

Johnston, David. "802 Handoff ECSG EC Closing Report." Jul. 2003. IEEE 00-03-0029-04-0000 802 Handoff EC Closing Report.

Williams, Michael Glenn. IEEE P802 Wired and Wireless LANs Handoff: Tentative Minutes of the IEEE P802 Handoff Executive Committee Study Group. Sep. 8, 2003. IEEE 00-03-0032-00-0000.

Paine, Richard. "Radio Resource Measurement: 802 Handoff Measurement Considerations." Mar. 2003. IEEE 802.11-03/125r4.

Hong, Cheng. "3GPP WLAN Interworking update." Mar. 16, 2004. IEEE 802.11-04/254r0.

Park, Soohong Daniel. "Access Router Identifier (ARID) for supporting L3 mobility." Jul. 2004. IEEE 802.11-04/710r0.

Gupta, Vivek. "Global Network Neighborhood." May 2004. IEEE 802.21.

Gupta, Vivek. "Steps in Handoffs and Use Cases." May 2004. IEEE 802.21.

Park, Soohong Daniel. "Awareness of the handover to be distinguished from a L2 or L3." Mar. 2004. 21-04-0002-00-0000-awareness handover L2$L3.ppt.

Johnston, David. "802.21, L2 Triggers A Strawman Proposal." Mar. 2004. 802.21 IETF Mobopts r1.

Shyy, Dong-Jye. "IEEE P802.21 Media Independent Handover Service: Draft Technical Requirements." Mar. 18, 2004. IEEE 802.21-04/00xx-00.

Williams, Michael Glenn. "IEEE P802 Wired and Wireless LANs Handoff: Tentative Minutes of the IEEE P802 Handoff Executive Committee Study Group." Jan. 13, 2004. 00-04-00XX-00-0000.

Williams, Michael Glenn. "IEEE P802 Wired and Wireless LANs Handoff: Tentative Minutes of the IEEE P802 Handoff Executive Committee Study Group." Jan. 14, 2004. 00-04-0XX-00-0000.
Williams, Michael Glenn. "IEEE P802 Wired and Wireless LANs Handoff: Tentative Minutes of the IEEE P802.21 Working Group." Mar. 18, 2004. 00-04-00XX-00/0000.
Gupta, Vivek. "Global Network Neighborhood." May 2004. IEEE 802.21.
Gupta, Vivek. "Steps in Handoffs and Use Cases." May 2004. IEEE 802.21.
Gupta, Vivek. IEEE P802.21 Media Independent Handover Mechanisms: Teleconference Meeting Minutes. Jun. 29, 2004. 21-04-0073-00-0000.
Gupta, Vivek. "IEEE P802.21 Media Independent Handover Service Draft Technical Requirements." Jul. 12, 2004. 21-04-0087-00-0000.
Faccin, Stefano M. "IEEE 802.21 Media Independent Handover." Jan. 10, 2004. 21-04-0169-03-0000.
"IEEE 802.21 MIHO: Media Independent Handover Functions and Services Specification." Mar. 14, 2004.
"IEEE 802.21 MIHO: Media Independent Handover Functions and Services Specification." Mar. 14, 2004. 21-05-0253-01-0000.
"Information technology—Telecommunications and information exchange between systemS—Local and metropolitan area networks—Specific requirements—Part 11: Wireless LAN Medium Access Control (MAC) and Physical Layer (PHY) Specifications." Jun. 12, 2003. ANSI/IEEE Std 802.11, 1999 Edition (R2003).
Park, Soohong Daniel. "Awareness of the handover to be distinguished from a L2 or L3." Mar. 2004. IEEE P802.21 Handoff.
Johnston, David. "802.21 L2 Services for Handover Optimization." Mar. 2004. 802.21 IETF DNA r1.
Johnston, David. "802.21, L2 Triggers a Strawman Proposal." Mar. 2004. 802.21 IETFMobopts r1.
Liu, Xiaoyu. Interaction between L2 and Upper Layers in IEEE 802.21. Mar. 4, 2004. 802.21 L2 Upper Layer Interaction r.
Johnston, David. "Architectural Elements of an 802 Handoff Solution." May 2003. 802 Handoff Archtecture Elements r1.
Johnston, David. "802 Handoff Call for Interest —an Expression of Interest." Mar. 2003. IEEE 802-03/xxxr1.
Williams, Michael Glenn. "IEEE P802 Wired and Wireless LANs Handoff: Tentative Minutes of the IEEE P802 Handoff Executive Committee Study Group." Nov. 10, 2003. 00-03-00XX-00/0000.
Williams, Michael Glenn. "IEEE P802 Wired and Wireless LANs Handoff: Tentative Minutes of the IEEE P802.21 Working Group." Mar. 16, 2004. 00-04-00XX-00-0000.
Williams, Michael Glenn. "IEEE P802 Wired and Wireless LANs Handoff: Tentative Minutes of the IEEE P802.21 Working Group." Mar. 18, 2004. 00-04-Ooxx-00/0000.
Johnston, David. "Handoff Scope Discussion Points." May 2003. 802 Handoff Scope Discussion.
Johnston, David. "Improved Stack Diagram" Mar. 12, 2003, IEEE C802.16REVd-04/XX.
Aboba, Bernard. "A Model for Context Transfer in IEEE 802." Apr. 6, 2002.
Arbaugh, William A. "Experimental Handoff Extension to Radius." Apr. 23, 2003.
Wu, Gang. "Fast handoff for Mobile IP and Link Layer Triggers." May 2003. P802-Handoff-03-xxxr0-ECSG.
Gupta, Vivek. "IEEE 802.21: A Generalized Model for Link Layer Triggers." Mar. 1, 2004.
Johnston, David. "802 Handoff ECSG EC Opening Plenary Report." Nov. 2003. 802 Handoff EC Opening Plenary Report r2.
Lin, Huai-An (Paul). "Handoff for Multi-interfaced 802 Mobile Devices." May 2003. IEEE P802 Handoff ECSG.
Lin, Huai-An (Paul). "IEEE P802 Handoff ECSG: Handoff for Multi-interfaced 802 Mobile Devices." May 12, 2003.
Kwak, Joe. "Handoff Functional Elements: an analysis of typical mobile systems." Nov. 11, 2002.
Tan, TK. "Wireless Interworking Group." Nov. 11, 2002. IEEE 802.11-xxx.
Natarajan, Nat. "Support of Layer 2 Triggers for Faster Handoffs." Nov. 10, 2003. IEEE P802.20-03/95.
Johnston, David. "IEEE 802 Handoff ECSG L2 Triggers." Jan. 2004. L2 Triggers dj r1.

Rajkumar, Ajay. "Mobile-Initiated Handoff Amongst Disparate WLAN and Cellular Systems." May 13, 2003.
Williams, Michael Glenn. "Media Independent Handover: Use Cases and Architecture Discussion Stimulus." Jan. 2004. IEEE 802.21.
"Draft Supplement to Standard for Telecommunications and Information Exchange Between Systems — Lan/Man Specific Requirements — Part 11: Wireless Medium Access Control (Mac) and physical layer (Phy) specifications: Medium Access Control (Mac) Enhancements for Quality of Service (QoS)." May 2002. IEEE Std 802.11e/D3.0.
Lin, Paul. "Proposed Problem and Scope Statements for Handoff ECSG." May 2003. IEEE P802 Handoff ECSG.
Das, Kaustubh. "Scope and Proposed Work Items for the Handoff Group." May 2003. IEEE P802 Handoff ECSG.
Das, Kaustubh. "Scope and Proposed Work Items for the Handoff Group." May 2003. IEEE P802 Handoff ECSG.
Gupta, Vivek. "Steps in L2 and L3 Handoffs." Jan. 2004. IEE P802 Handoff ECSG.
Arbaugh, William a. "Experimental Handoff Extension of RADIUS." Apr. 23, 2003.
Aboba, Bernard. "A Model for Context Transfer in IEEE 802." Apr. 6, 2002.
Marks, Roger. "Handoff Mechanisms and their Role in IEEE 802 Wireless Standards." Oct. 9, 2002. IEEE T802.16-02/03.
Lee, Young J. "IEEE P802.11 Wireless LANs: the Strategy for interworking between WLAN and cdma2000." Nov. 10, 2003. IEEE 802.11-00/xxx.
Lee, Young J. "An Strategy for interworking between WLAN and cdma2000." Nov. 2003. IEEE 802.11-00/xxx.
Shyy, Dong-Jye. "IEEE 802.21 WG—Suggested Architectures for Different Handover Scenarios." Mar. 2004. IEEE 802.21-04/xxxr0.
Johnston, David. "802.21 L2.5 Model." Mar. 2004. 802.21 L2.5 Option r1.
Gupta, Vivek. "IEEE P802.21 Media Independent Handover Service Draft Technical Requirements." Aug. 17, 2004.
Gupta, Vivek. "IEEE P802.21 Media Independent Handover Service Draft Technical Requirements." Sep. 21, 2004. 21-04-0087-12-0000.
Gupta, Vivek. "IEEE P802.21 Media Independent Handover." Jan. 18, 2005. 21-05-0168-02-0000-MIH.
"3rd Generation Partnership Project; Technical Specification Group Services and Systems Aspects; Network architecture (Release 6)." 3GPP TS 23.002 V6.5.0 (Jun. 2004).
"3rd Generation Partnership Project; Technical Specification Group Services and Systems Aspects; General Packet Radio Service (Gprs); Service description; State 2 (Release 5)." 3GPP TS 23.060 V5.9.0 (Sep. 2004).
"3rd Generation Partnership Project; Technical Specification Group Services and Systems Aspects; 3GPP system to Wireless Local Area Network (WLAN) interworking; System description (Release 6)." 3GPP TS 23.234 V6.1.0 (Jun. 2004).
"3rd Generation Partnership Project; Technical Specification Group Services and Systems Aspects; 3GPP system to Wireless Local Area Network (WLAN) interworking; System description (Release 6)." 3GPP TS 23.234 V6.2.0 (Sep. 2004).
"3rd Generation Partnership Project; Technical Specification Group GSM/EDGE Radio Access Network; Feasibility Study on generic access to A/Gb interface (Release 6)." 3GPP TR 43.901 V6.0.0 (Aug. 2004).
McCann, P. "Mobile IPv6 Fast Handovers for 802.11 Networks." Jul. 2004.
Soliman et al. "Hierarchical Mobile IPv6 mobility management (HMIPv6)." Originally Published Jun. 15, 2004; Republished Dec. 2004.
Malki, El. K. "Low Latency Handoffs in Mobile IPv4." Jun. 2004.
Dommety et al. "Mobile IP Vendor/Organization-Specific Extension." Apr. 2001.
Koodli, R. "Fast Handovers for Mobile IPv6." Originally Published Jun. 2004; Republished Jul. 2005.
"Unlicensed Mobile Access (UMA); User Perspective (Stage 1)." UMA User Perspective (Stage 1) R1.0.0 (Sep. 1, 2004).
"Unlicensed Mobile Access (UMA); Architecture (Stage 2)." UMA Architecture (Stage 2) R1.0.0 (Sep. 1, 2004).

"Unlicensed Mobile Access (UMA); Protocols (Stage 3)." UMA Protocols(Stage 3) R1.0.0 (Sep. 1, 2004).

Wang, Xin Gang et al. "Towards Providing QoS for Integrated Cellular and WLAN Networks." 2003.

Wu, John Chiung-Shien et al. "Intelligent Handoff for Mobile Wireless Internet." 2001.

"IEEE P801.21/D00.01 Draft IEEE Standard for Local and Metropolitan Area Networks: Media Independent Handover Services." IEEE P801.21™/D00.01, Jul. 2005.

"Draft Amendment to Standard for Information Technology — Telecommunications and Information Exchange Between Systems — LAN/MAN Specific Requirements — Part 11: Wireless Medium Access Control (MAC) and physical layer (PHY) specifications—Amendment 7: Radio Resource Measurement." IEEE P802.11k/D1.0, Jul. 2004.

"Draft Amendment to Standard for Information Technology — Telecommunications and Information Exchange Between Systems — LAN/MAN Specific Requirements — Part 11: Wireless Medium Access Control (MAC) and physical layer (PHY) specifications—Amendment 9: Radio Resource Measurement." IEEE P802.11k/D3.0, Oct. 2004.

"802.16™ IEEE Standard for Local and metropolitan area networks—Part 16: Air Interface for Fixed Broadband Wireless Access Systems. " IEEE Std 802.16Tm-2004 Oct. 1, 2004.

* cited by examiner

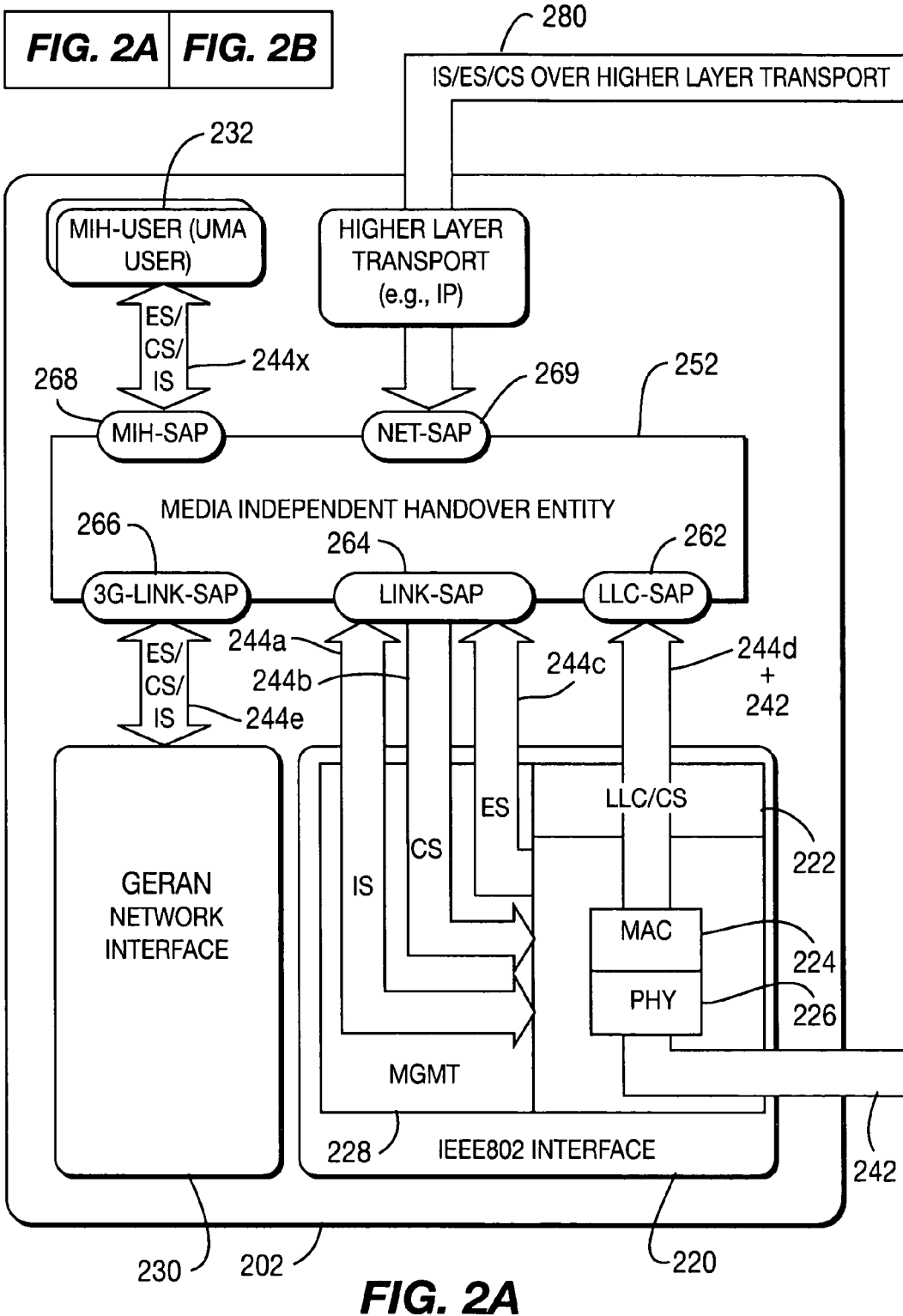

US 7,746,825 B2

METHOD AND SYSTEM FOR INTEGRATING MEDIA INDEPENDENT HANDOVERS

CROSS REFERENCE TO RELATED APPLICATION

This application claims the benefit of U.S. Provisional Application No. 60/681,259 filed May 16, 2005, which is incorporated by reference as if fully set forth.

FIELD OF INVENTION

The present invention is related to wireless communication systems. More particularly, the present invention is related a method and system for integrating media independent handovers (MIHs) under IEEE 802.21 and unlicensed mobile access (UMA).

BACKGROUND

Different types of wireless communication systems have been developed to provide different types of services. Some examples of the wireless communication systems include a wireless local area network (WLAN), a wireless wide area network (WWAN) and a cellular network such as universal mobile telecommunication systems (UMTS). Each of these systems have been developed and tailored to provide specific applications for which each system is intended.

With the pervasive adoption of wireless communication networks in enterprise, residential and public domains, continuous connectivity can be supported as the users move from one network to the other. With the emerging "always-on" life style, wireless transmit/receive units (WTRUs), (i.e., mobile stations), are required to support multiple heterogeneous networks. For seamless handover between these networks, an IEEE 802.21 MIH has been proposed.

In the meanwhile, UMA technology provides access to a global system for mobile communication (GSM) and general packet radio services (GPRS) over unlicensed spectrum technologies, such as Bluetooth™ and IEEE 802.11. By deploying UMA technology, service providers can enable subscribers to roam and handover between cellular networks and public and private unlicensed wireless networks using dual-mode WTRUs. With UMA, subscribers receive continuous services as they transition between networks.

However, UMA technology does not address how a particular handover condition arises and how heterogeneous link layers can communicate these conditions to the upper layers handling the handover. Thus, there are no procedures or functionality in UMA to generate triggers toward upper layers. Therefore, there is a need to provide the triggers for handover within the UMA architecture.

SUMMARY

The present invention is related to a method and system for integrating MIH under IEEE 802.21 and UMA. A public land mobile network (PLMN) and an unlicensed mobile access network (UMAN) are concurrently deployed. UMA is supported such that a multi-mode WTRU may access the UMAN to receive PLMN services through the UMAN. MIH entities are included both in the WTRU and the UMAN and the MIH entity of the WTRU monitors handover events and information and generates a handover trigger for handover between the PLMN and the UMAN. The MIH entity in the UMAN interacts with the MIH entity of the WTRU to report a remote event, handover information and command.

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENTS

Hereafter, the terminology "WTRU" includes, but is not limited, to a user equipment, a mobile station, a fixed or mobile subscriber unit, a pager, or any other type of device capable of operating in a wireless environment. When referred to hereafter, the terminology "base station" and "AP" include, but are not limited to, a Node-B, a site controller or any other type of interfacing device in a wireless environment.

The features of the present invention may be incorporated into an integrated circuit (IC) or be configured in a circuit comprising a multitude of interconnecting components.

Figure 1:
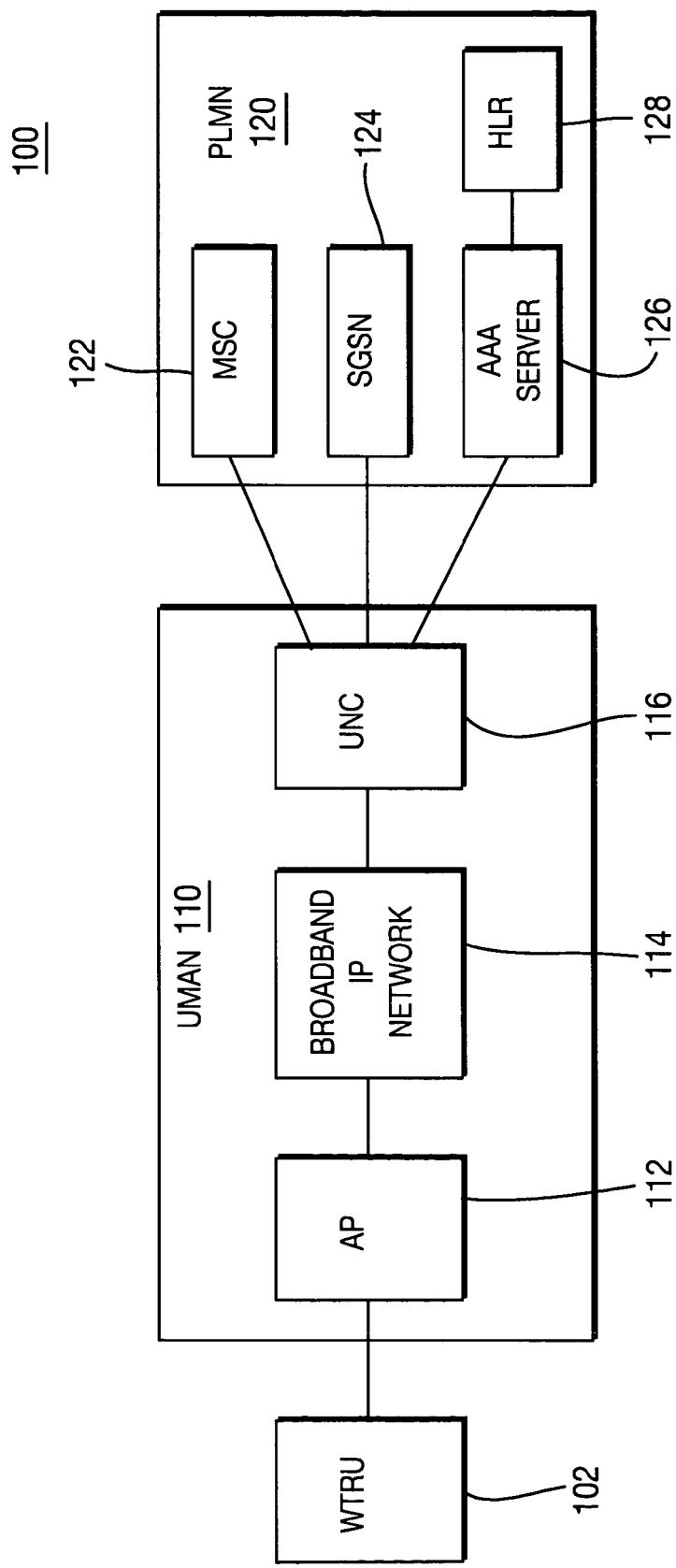
FIG. 1 shows a prior art UMA functional architecture of a wireless communication system.

FIG. 1 shows a prior art UMA functional architecture of a wireless communication system 100. The wireless communication system 100 comprises a UMAN 110 and a PLMN 120. The UMAN 110 may be a Bluetooth™ network, an IEEE 802.11 network or other similar wireless networks using unlicensed frequency band. The PLNM 120 may be any type of cellular networks including, but not limited to, third generation partnership project (3GPP) and 3GPP2 networks.

The UMAN 110 comprises at least one AP 112 and at least one UMA network controller (UNC) 116 and a broadband IP network 114 connecting the AP 112 and the UNC 116. The AP 112 provides radio access to a WTRU 102. The broadband IP network 114 provides connectivity between the AP 112 and the UNC 116. The WTRU 102 is a multi-mode device which supports more than one interface including, but not limited to, IEEE 802.3, 802.11, 802.15, 802.16, 802.20, Bluetooth™, HYPERLAN/2, 3GPP and 3GPP2. The PLMN 120 includes, among other things, a mobile switching center (MSC) 122, a serving GPRS support node (SGSN) 124, an authentication, authorization and accounting (AAA) server 126 and a home location register (HLR) 128. The UNC 116 connects to the MSC 122 and the SGSN 124 for supporting circuit switched (CS) and packet switched (PS) services, respectively, for the WTRU 102 through the UMAN 110.

Figure 2B:
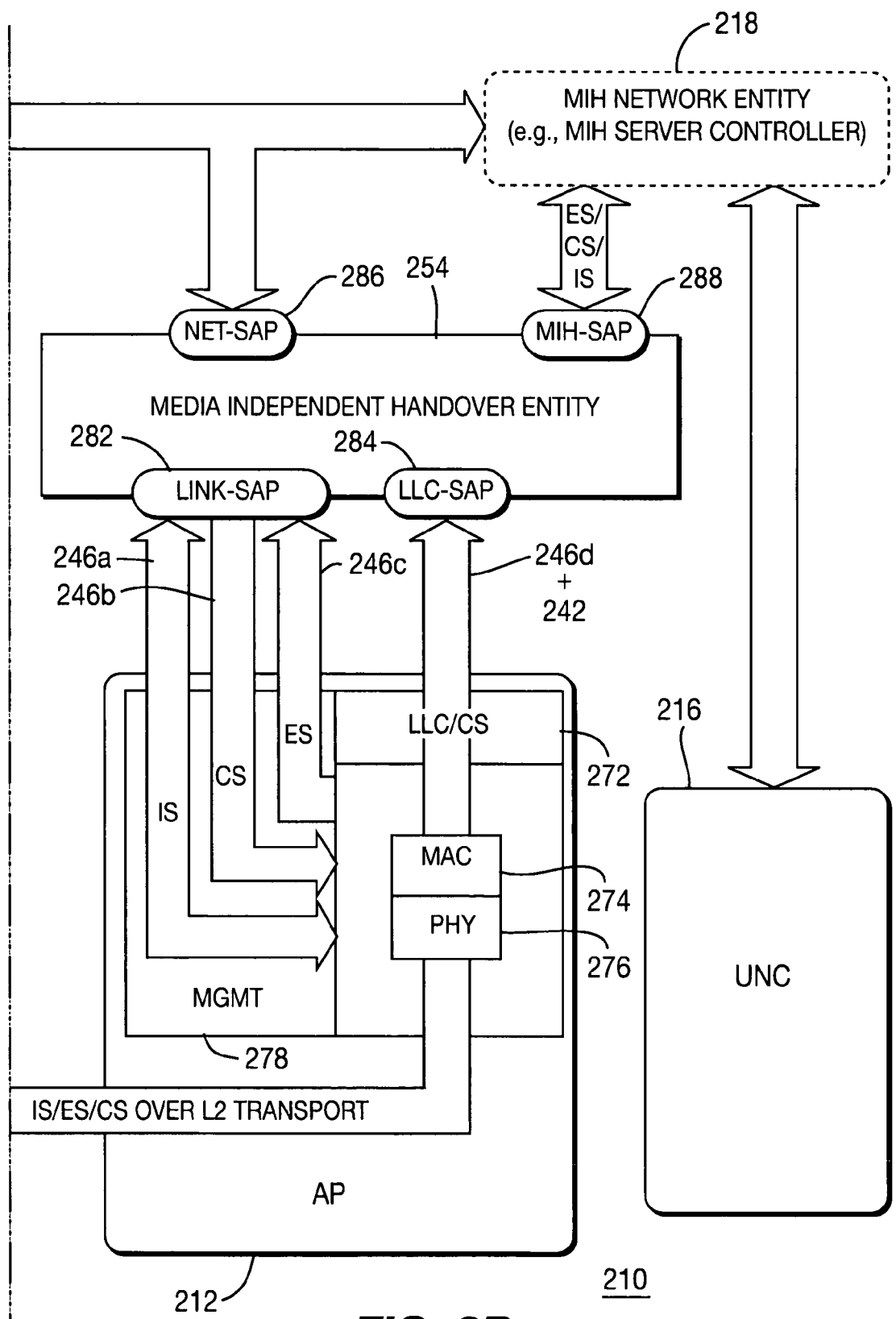
FIG. 2 shows a WTRU and in a network along with signalling between MIH entities in accordance with the present invention.

FIG. 2 shows signalling between a WTRU 202 and a UMAN 210, (i.e., an AP 212, a UNC 216 and an MIH network entity 218), in accordance with the present invention. MIH entities 252, 254 are included in the WTRU 202 and the network 210, respectively, to support seamless handover between heterogeneous networks. The MIH entities 252, 254 are separate layer-independent entities and may work independently as a sole handover management entity or may coordinate with an existing technology-specific handover entity. The MIH entity 254 in the network may be a separate entity or may reside in any entity, such as the AP 212 or the UNC 216.

Figure 5:
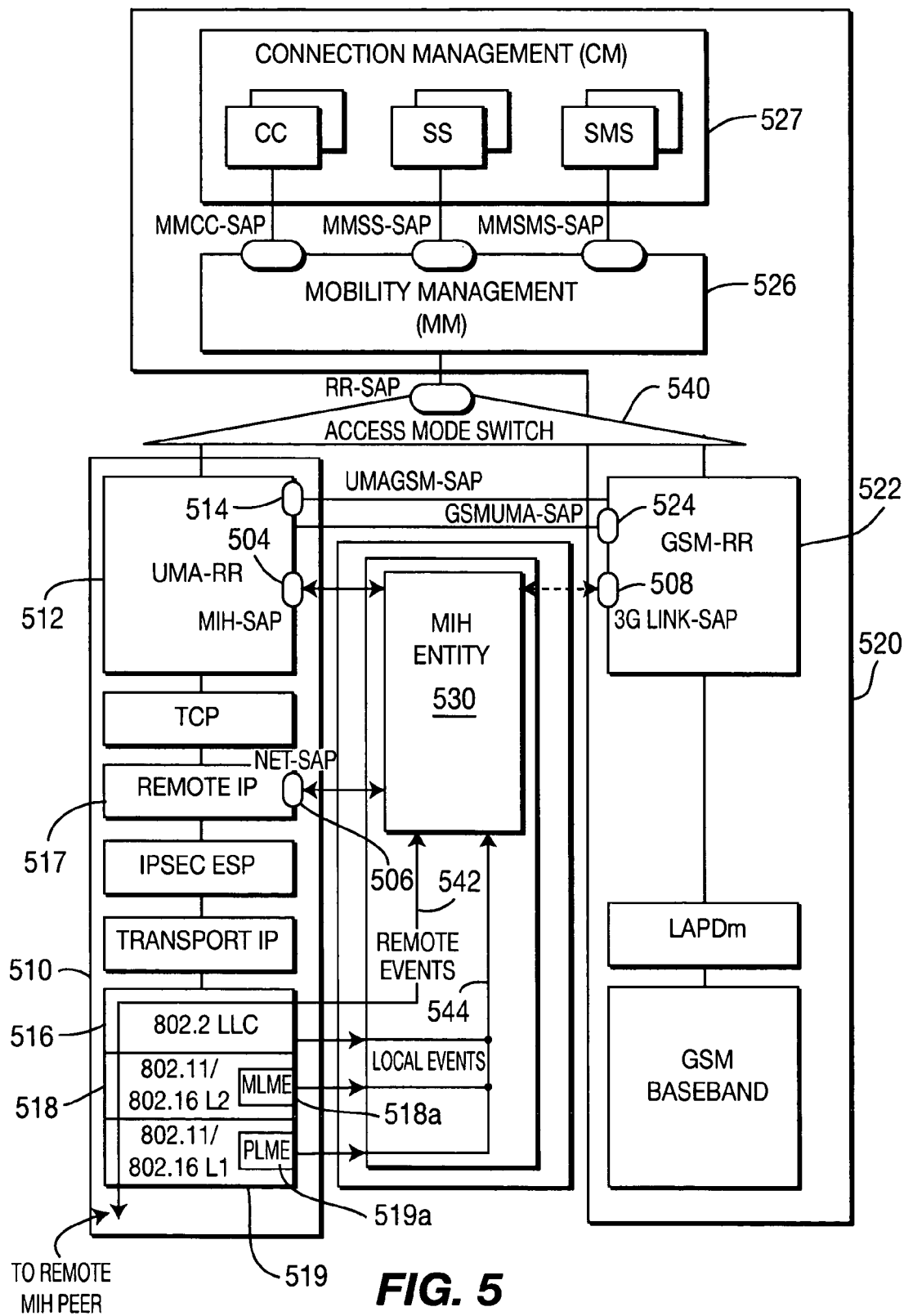
FIG. 5 shows a WTRU CS domain signaling architecture in accordance with the present invention.

The WTRU 202 includes an IEEE 802 interface 220, a GSM EDGE radio access network (GERAN) network interface 230 and an MIH entity 252. The WTRU 202 may have one or more additional MIH user 232. The IEEE 802 interface 220 includes a logical link control/convergence sub-layer (LLC/CS) 222, a medium access control (MAC) layer 224, and a physical (PHY) layer 226. It should be noted that FIG. 2 shows only lower layer entities for simplicity and higher layer entities are shown in FIG. 5.

The MIH entity 252 in the WTRU 202 exchanges local handover events, information and commands 244a-244d with lower layers of the WTRU 202, (i.e., the LLC/CS layer 222, the MAC layer 224 and a PHY layer 226), and exchanges remote events, information and commands 242 with the MIH entity 254 of the network 210. Local handover information is communicated between the MIH entity 252 and the MAC/PHY layers 224/226 by an information service (IS) 244a, and a command service (CS) 244b and an event service (ES) 244c are exchanged between the MIH entity 252 and the MAC/PHY layers 224/226 for local handover events and commands via management entity 228. These local events, information and commands 244a-244c are communicated through a LINK-SAP 264 of the MIH entity 252. The remote events 242 are also communicated between the MIH entity 254 and the MIH entity 252 by an IS, CS and ES over layer 2 transport 242. The MIH entity 252 also communicates with the LLC/CS 222 through LLC-SAP 262 for the local events.

The GERAN network interface 230 communicates handover events with the MIH entity 252 by ES, CS and IS 244e via a 3G-LINK-SAP 266. The additional MIH user 232 also communicates handover events with the MIH entity 252 by ES, CS and IS 244x via an MIH-SAP 268. The MIH user 232 is any mobility application that can take advantage of MIH services provided by the MIH entity 252. UMA-RR 512 and GSM-RR 522 in FIG. 5 are examples of MIH users.

The handover events and information may be any events or information relevant to handover. For example, if an unrecoverable failure condition occurs in the network 210, the network 210 may signal this occurrence to the WTRU 202 so that the WTRU 202 may switch to a different network interface. Another example is the existence of alternative networks with better radio/service condition, (e.g., better price or better QoS). Commands are sent from the MIH User, (e.g., UMA-RR 512 or GSM-RR 522 in FIG. 5), to order an execution of a handover.

The AP 212 includes an LLC/CS 272, a MAC layer 274, a PHY layer 276. In the network, local handover events, information and commands are communicated between the MAC/PHY layers 274/276 and the MIH entity by IS, CS and ES 246a-246c via a management entity 278, and between the LLC/CS 272 and the MIH entity 254.

The MIH entity 254 may exist separately and communicate the local and remote events, information and commands with the AP 212 using a higher layer transport protocol or L2 transport. Alternatively, the MIH entity 254 and the AP 212 may reside in the same place. The MIH entity 254 includes a LINK-SAP 282 for communicating local events from the MAC/PHY layers 274/276 and an LLC-SAP 284 for communicating remote events and local events from the LLC/CS 272.

Current and any anticipated future changes in condition of different networks may be signalled via NET-SAPs 269, 286 between the MIH entities 252, 254 and/or the MIH network entity 218, (such as an MIH server controller), by IS/CS/ES 280 over a higher layer transport protocol, such as IP. These conditions include changes in the MAC layer and the PHY layer states or changes in certain network attributes, such as changes in load conditions. The MIH entity 252 of the WTRU 202 determines whether a handover is required based on the collected events, information and commands in accordance with certain criteria, such as link quality, service and subscription.

The MIH network entity 218 is any entity within the network that is able to operate according to the IEEE 802.21 protocol. The MIH network entity 218 handles messages used by any of the MIH services, (i.e., ES, IS and CS). However, the MIH network entity 218 does not have to respond or act upon these messages, but may ignore the messages. The MIH entity 254 communicates the handover events with the MIH network entity 218 by an IS, ES, CS via MIH-SAP 288. The MIH network entity 218 also communicates with the UNC 216 using a higher layer transport protocol. For example, the MIH network entity may generate handover commands and information and send them to the MIH entity 254 and the MIH entity 254 may generate remote events and inter-technology network information requests. In both cases messages flow though the 280 interface.

The UNC 216 provides network capability information to the MIH network entity 218. In addition the interface between the UNC 216 and the MIH network entity 218 can be used to support inter-technology mobility management messages for WTRUs that are IEEE 802.21 capable but do not support UMA functionality. In this scenario the MIH network entity 218 may serve as an inter-working function between the UNC and the WTRU.

Figure 3:
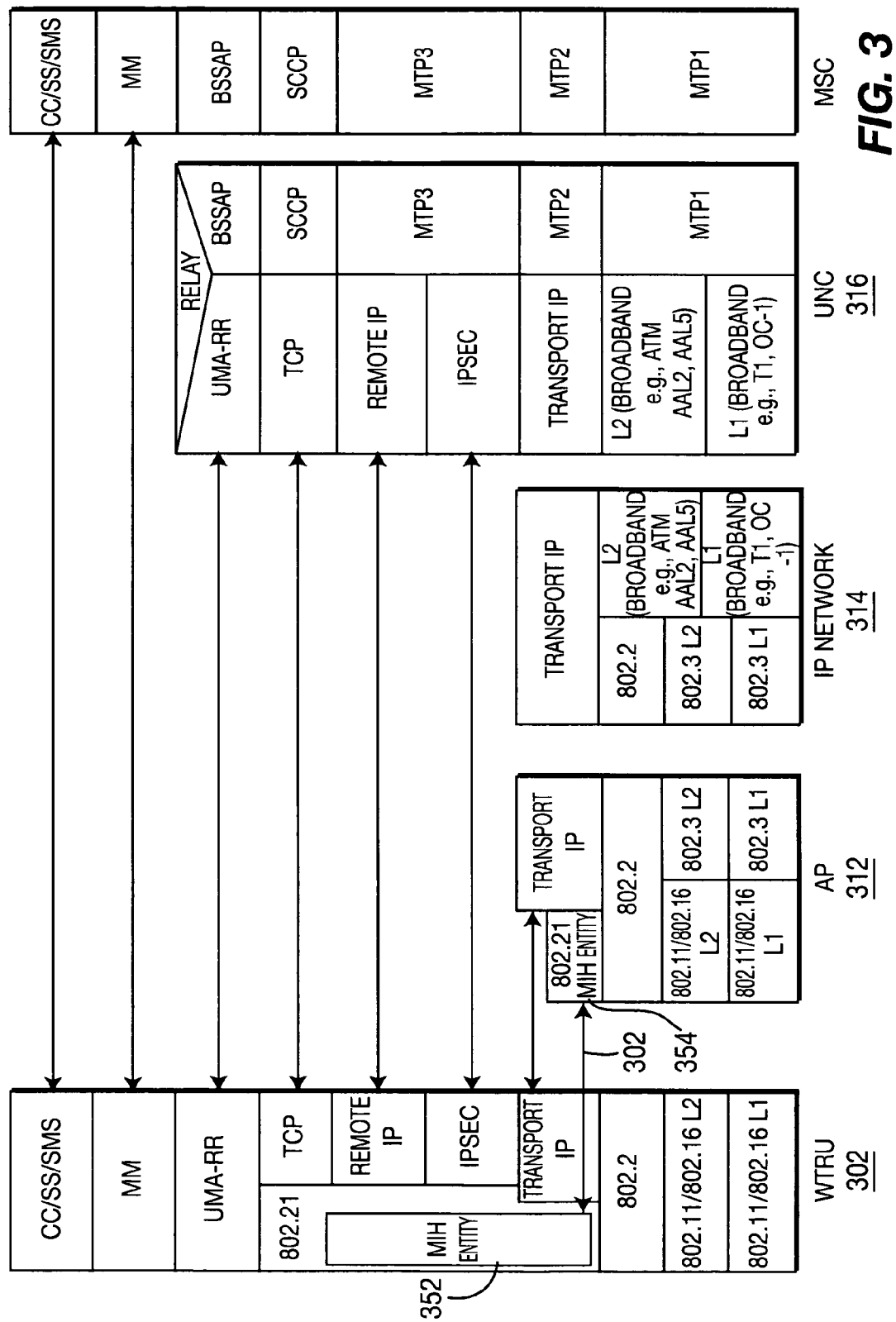
FIG. 3 shows a UMA-MIH protocol architecture in a circuit switched (CS) domain in accordance with the present invention.
Figure 4:
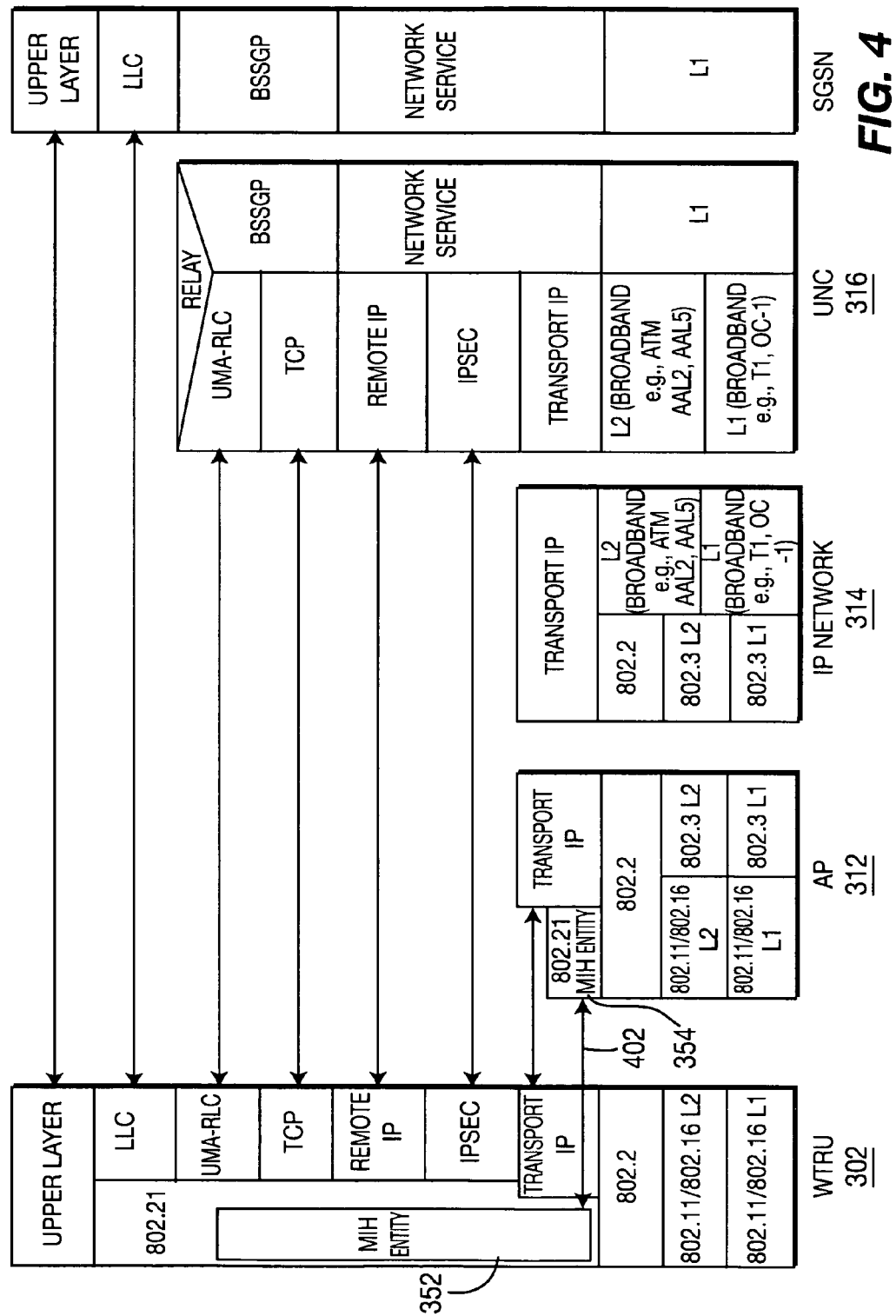
FIG. 4 shows a UMA-MIH protocol architecture in a packet switched (PS) domain in accordance with the present invention.

FIGS. 3 and 4 show UMA-MIH protocol architecture in a CS domain and a PS domain, respectively, in accordance with the present invention. The UMA protocol architecture is well known in the art and, therefore, will not be explained herein for simplicity. In accordance with the present invention, the MIH entities 352, 354 are included in the protocol stack of the WTRU 302 and the network, respectively, as explained hereinabove. The MIH entity in the network may be a separate entity or may reside in any network entity, such as the AP 312 as shown in FIGS. 3 and 4. The MIH entity 352 in the WTRU 302 interacts with the MIH entity 354 to send and receive remote events as indicated by arrows 302, 402. The FIGS. 3-5 depict IEEE 802.xx technology in the lower layers as an example, and it should be noted that any UMA technology, such as Bluetooth™, may be implemented instead of IEEE 802.xx technology.

FIG. 5 shows a WTRU CS domain signaling architecture in accordance with the present invention. The WTRU 502 is a multi-mode device including both a UMA interface and a GSM interface. It should be noted that FIG. 5 depicts a GSM interface as an example and 3GPP, 3GPP2 or any other cellular network interface may be implemented. The WTRU 502 comprises a UMA protocol stack 510, a GSM protocol stack 520, an MIH entity 530 and an access mode switch 540. The MIH entity 530 is provided in the WTRU 502 for monitoring handover triggering events, information and commands and generates and sends a handover trigger to an upper layer, (such as a mobility management (MM) layer 526). The MM layer 526 and a connection management (CM) layer 527 operate in common for both a GSM mode and a UMA mode and the GSM mode and the UMA mode is selectively switched by the access mode switch 540. The individual layers and entities of the UMA protocol stack 510 and the GSM protocol stack 520 are well known in the art and, therefore, will not be explained herein for simplicity. The UMA-radio resource entity (UMA-RR) 512 and the GSM-radio resource entity (GSM-RR) 522 provide radio resource management functions and interact with the MIH entity 530.

New service access points (SAPs) are provided in addition to existing SAPs, (UMAGSM-SAP 514 and GSMUMA-SAP 524), between the UMA-RR 512 and a remote IP layer 517 and the MIH entity 530 and between the GSM-RR 522 and the MIH entity 530 in accordance with the present invention. An MIH-SAP 504 is provided between the MIH entity 530 and the UMA-RR 512 and a 3GLINK-SAP 508 is provided between the MIH entity 530 and the GSM-RR 522. A NET-SAP 506 is provided between the MIH entity 530 and a remote IP layer 517.

The GMS-RR 522 provides an interface to an existing radio condition that might be used by the MIH entity 530 to generate a handover indication. This information can be retrieved directly from the GSMUMA-SAP 524. The difference between the GSMUMA-SAP 524 and the 3GLINK-SAP 508 is that going through the MIH entity 530 a compound message including both IEEE 802 and GERAN is sent to the UMA-RR user as opposed to only GERAN information.

The MIH entity 530 collects local events 544 from the LLC layer 516, the MAC layer 518, (via a MAC layer management entity (MLME) 518a), and the PHY layer 519, (via a PHY layer management entity (PLME) 519a), and remote events 542 and handover related information from MIH peers in the network. The MIH entity 530 monitors handover triggering events and generates a handover trigger based on the collected events and information if a certain threshold is exceeded.

Figure 6:
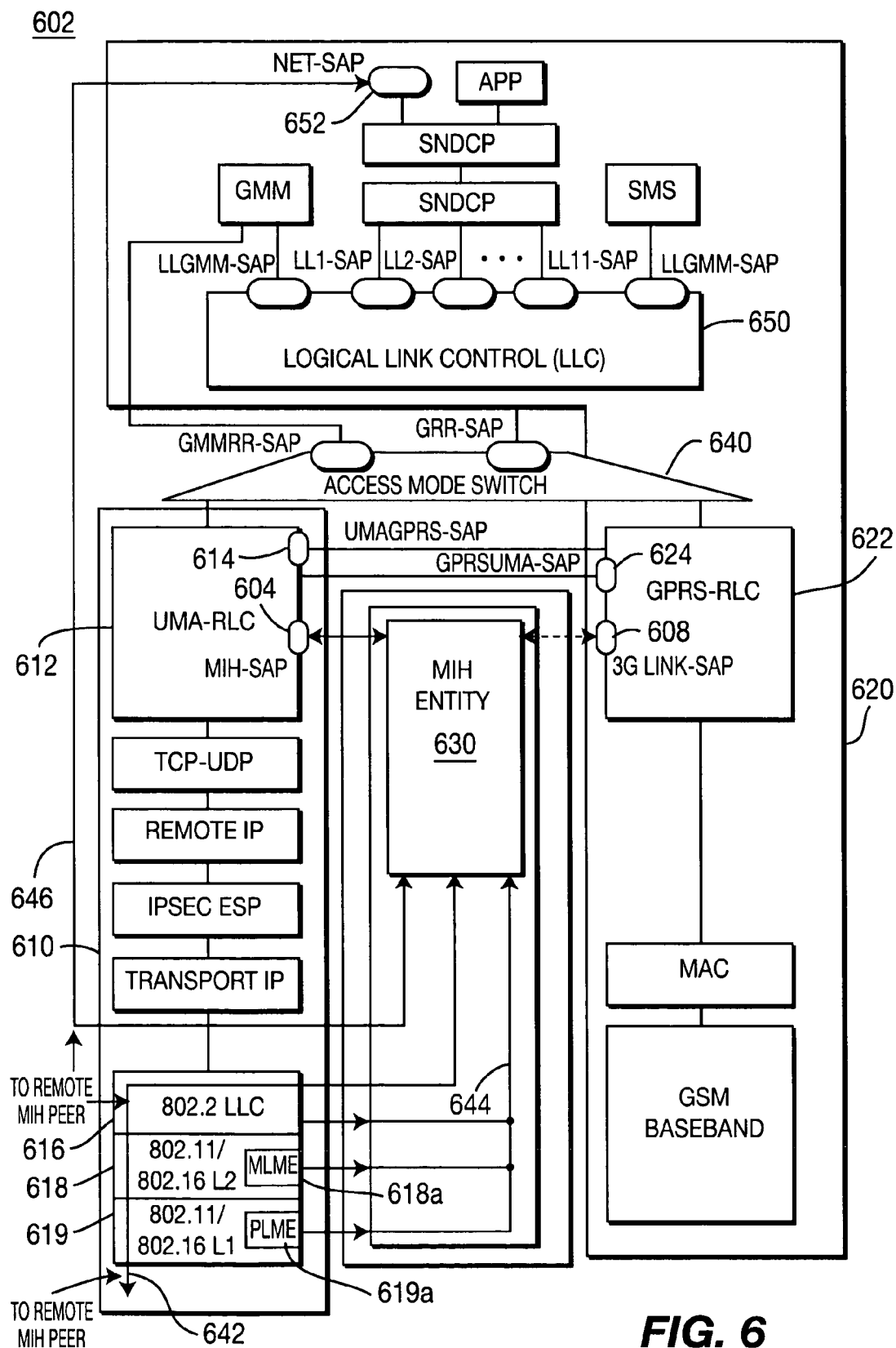
FIG. 6 shows a WTRU PS domain signaling architecture in accordance with the present invention.

FIG. 6 shows a WTRU PS domain signaling architecture in accordance with the present invention. The WTRU 602 is a multi-mode device including both a UMA interface and a GPRS interface. It should be noted that FIG. 6 depicts a GPRS interface as an example and 3GPP, 3GPP2 or any other cellular network interface may be implemented. The WTRU 602 comprises a UMA protocol stack 610, a GPRS protocol stack 620, an MIH entity 630 and an access mode switch 640. The MIH entity 630 is provided in the WTRU 602 for monitoring handover triggering events, information and commands and generates and sends a handover trigger to an upper layer. The LLC layer 650 operates in common for both a GPRS mode and a UMA mode and the GPRS mode and the UMA mode is selectively switched by the access mode switch 640. The UMA-radio link control (UMA-RLC) layer 512 peers with the GPRS-RLC layer 522 to provide coordination for access mode switching and handovers.

New service access points (SAPs) are provided in addition to existing SAPs, (UMAGPRS-SAP 614 and GPRSUMA-SAP 624), between the UMA-RLC 612 and the MIH entity 630 and between the GPRS-RLC 622 and the MIH entity 630 in accordance with the present invention. An MIH-SAP 604 is provided between the MIH entity 630 and the UMA-RLC 612 and a 3GLINK-SAP 608 is provided between the MIH entity 630 and the GPRS-RLC 622.

The MIH entity 630 collects local events 644 from the LLC layer 616, the MAC layer 618, (via a MAC layer management entity (MLME) 618a), and the PHY layer 619, (via a PHY layer management entity (PLME) 619a). The MIH entity 630 exchanges remote events and handover information 642, 644 from MIH peers in the network. The remote events and handover information may be sent via a NET-SAP 652 to an MIH peer. The MIH entity 630 monitors handover triggering events and generates a handover trigger based on the collected events and information if a certain threshold is exceeded.

Figure 7:
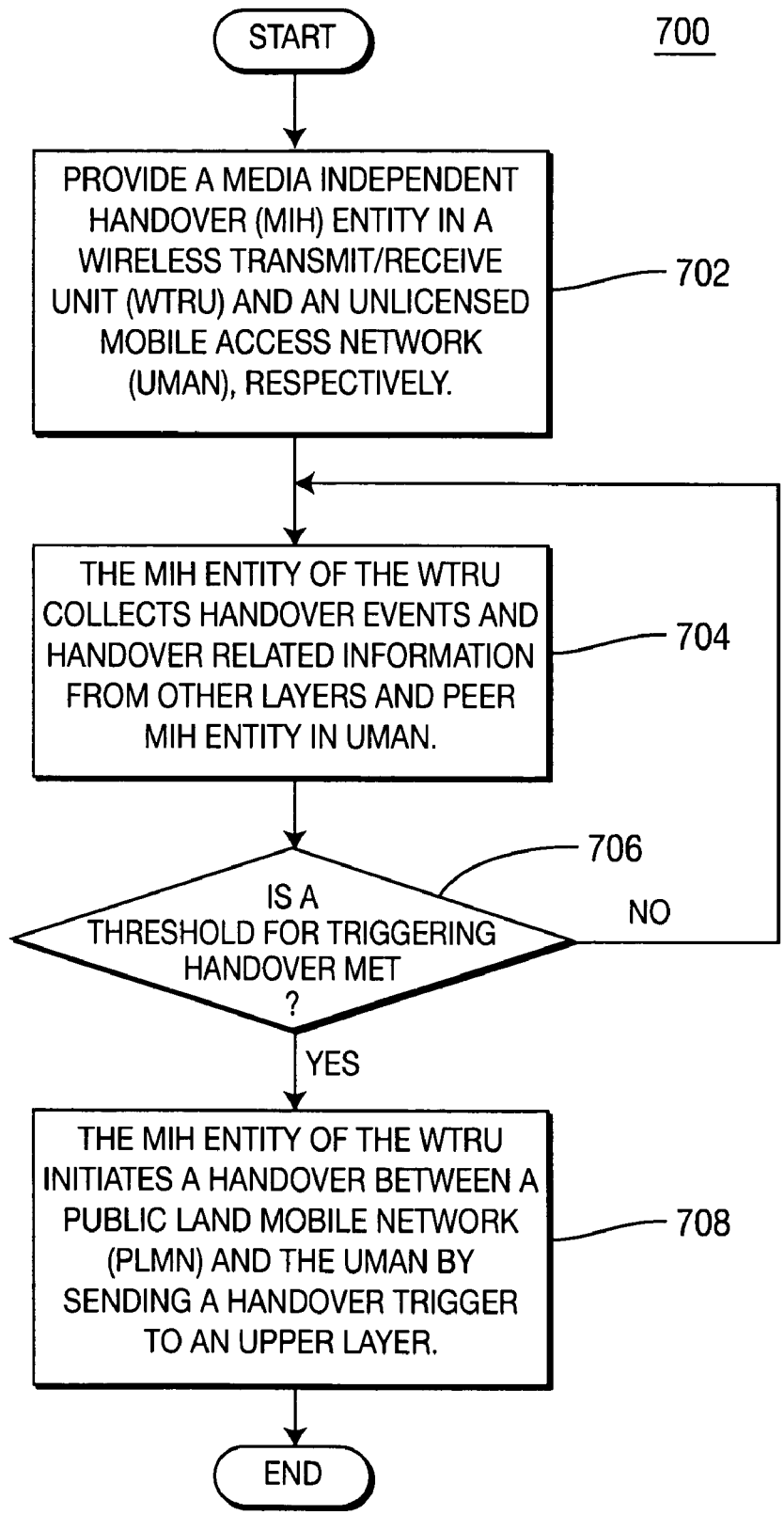
FIG. 7 is a flow diagram of a process for triggering handover between a an unlicensed mobile access network (UMAN) and a public land mobile network (PLMN) in accordance with the present invention.

FIG. 7 is a flow diagram of a process 700 for triggering handover between a UMAN and a PLMN in accordance with the present invention. An MIH entity is provided in a WTRU and a network, respectively (step 702). The MIH entity of the WTRU collects handover events and handover related information from lower layers and peer MIH entities in the network (step 704). The MIH entity of the WTRU determines whether a threshold for triggering handover is met based on the collected handover events and handover related information (step 706). If the determination at step 706 is positive, the MIH entity of the WTRU initiates a handover between the PLMN and the UMAN by sending a handover trigger to an upper layer (step 708). If the threshold is not met, the process 700 returns to step 704 to monitor handover events and information.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless transmit/receive unit (WTRU) operable in an unlicensed mobile access (UMA) wireless communication network, the WTRU comprising:
   a processor configured to operate:
      a UMA protocol stack including a physical (PHY) layer, a medium access control (MAC) layer, and a plurality of higher layers including a UMA radio resource control (UMA-RR) layer operable to facilitate mobility of the WTRU;
      a cellular protocol stack including a PHY layer, a MAC layer, and a plurality of higher layers; and
      a media independent handover (MIH) entity configured to communicate MIH information for mobility management between the UMA PHY layer, the UMA MAC layer, and the UMA-RR layer via an MIH service access point (MIH-SAP), wherein the MIH entity is configured to:
   monitor handover related information through an information service;
   collect the handover related information;
   receive information from a higher layer of the cellular protocol stack via a cellular link SAP;
   create a compound message containing information relating to the UMA protocol stack and the cellular protocol stack;
   compare the information in the compound message to a threshold;
   generate a handover trigger on a condition that the information in the compound message exceeds the threshold; and
   communicate the trigger to an upper level of the UMA protocol stack on a condition that the threshold is exceeded.

2. The WTRU of claim 1, wherein the plurality of higher layers of the cellular protocol stack include a cellular radio resource control layer, and wherein the MIH entity is further configured to communicate MIH information for mobility management between the UMA PHY layer, the UMA MAC layer, and the cellular radio resource control layer via a 3GLINK-SAP.

3. The WTRU of claim 2, wherein the cellular protocol stack is a GSM protocol stack.

4. The WTRU of claim 2, wherein the cellular protocol stack is a Third Generation Partnership Project (3GPP) protocol stack.

5. The WTRU of claim 2, wherein the cellular protocol stack is a 3GPP2 protocol stack.

6. The WTRU of claim 2, wherein the UMA protocol stack is an IEEE 802.11 protocol stack.

7. The WTRU of claim 2, wherein the MIH information includes an MIH event service.

8. The WTRU of claim 2, wherein the MIH information includes an MIH command service.

9. The WTRU of claim 2, wherein the UMA-RR layer is further configured to directly communicate link information with the cellular radio resource control layer via a UMA-cellular SAP.

10. The WTRU of claim 2, wherein the cellular radio resource control layer is further configured to directly communicate link information with the UMA-RR via a cellular-UMA SAP.

11. The WTRU of claim 1, wherein the plurality of higher layers of the UMA protocol stack include a remote Internet protocol (IP) layer, and the MIH entity is further configured to communicate MIH information with the remote IP layer via a NET-SAP.

12. The WTRU of claim 1, wherein the PHY layer of the UMA protocol stack includes a PHY layer management entity (PLME), the MAC layer of the UMA protocol stack includes a MAC layer management entity (MLME), and the MIH entity is further configured to collect a local event from the PLME and the MLME.

13. The WTRU of claim 1, wherein the WTRU is operable to form a circuit switched (CS) communication session with a wireless communication network.

14. A wireless transmit/receive unit (WTRU) operable in an unlicensed mobile access (UMA) wireless communication network, the WTRU comprising:
a processor configured to operate:
a UMA protocol stack including a physical (PHY) layer, a medium access control (MAC) layer, and a plurality of higher layers including a UMA radio link control (UMA-RLC) layer operable to facilitate mobility of the WTRU;
a cellular protocol stack including a PHY layer, a MAC layer, and a plurality of higher layers; and
a media independent handover (MIH) entity configured to:
monitor handover related information through an information service;
collect the handover related information;
receive information from a higher layer of the cellular protocol stack via a cellular link service access point (SAP);
create a compound message containing information relating to the UMA protocol stack and the cellular protocol stack;
compare the information in the compound message to a threshold;
generate a handover trigger on a condition that the information in the compound message exceeds the threshold; and
communicate the trigger to the UMA-RLC layer via a MIH service access point (MIH-SAP) on a condition that the threshold is exceeded.

15. The WTRU of claim 14, wherein the plurality of higher layers of the cellular protocol stack include a cellular radio link control layer, and wherein the MIH entity is further configured to communicate MIH information for mobility management between the UMA PHY layer, the UMA MAC layer, and the cellular radio link control layer via a 3GLINK-SAP.

16. The WTRU of claim 15, wherein the cellular protocol stack is a GPRS protocol stack.

17. The WTRU of claim 15, wherein the cellular protocol stack is a Third Generation Partnership Project (3GPP) protocol stack.

18. The WTRU of claim 15, wherein the cellular protocol stack is a 3GPP2 protocol stack.

19. The WTRU of claim 14, wherein the UMA protocol stack is an IEEE 802.11 protocol stack.

20. The WTRU of claim 15, wherein the MIH information includes an MIH event service.

21. The WTRU of claim 15, wherein the MIH information includes an MIH command service.

22. The WTRU of claim 15, wherein the UMA-RR layer is further configured to directly communicate link information with the cellular radio link control layer via a UMA-cellular SAP.

23. The WTRU of claim 15, wherein the cellular radio link control layer is further configured to directly communicate link information with the UMA-RR via a cellular-UMA SAP.

24. The WTRU of claim 14, wherein the PHY layer of the UMA protocol stack includes a PHY layer management entity (PLME), the MAC layer of the UMA protocol stack includes a MAC layer management entity (MLME), and the MIH entity is further configured to collect a local event from the PLME and the MLME.

25. The WTRU of claim 15, wherein the WTRU is operable to form a packet switched (PS) communication session with a wireless communication network.

* * * * *

UNITED STATES PATENT AND TRADEMARK OFFICE
CERTIFICATE OF CORRECTION

| | | |
|---|---|---|
| PATENT NO. | : 7,746,825 B2 | Page 1 of 1 |
| APPLICATION NO. | : 11/317994 | |
| DATED | : June 29, 2010 | |
| INVENTOR(S) | : Olvera-Hernandez et al. | |

It is certified that error appears in the above-identified patent and that said Letters Patent is hereby corrected as shown below:

ON THE TITLE PAGE

At Section (56) OTHER PUBLICATIONS, page 4, right column, after "Independent Handover Services,"" delete "Dec." and insert --Oct.--.

At Section (56) OTHER PUBLICATIONS, page 4, right column, after "Document: IEEE 802.11-" delete "02/50800" and insert --02/508r10--.

At Section (56) OTHER PUBLICATIONS, page 6, left column, after "IEEE P802. 11k/D3.0, Oct." delete "2004" and insert --2005--.

IN THE CLAIMS

At Claim 6, column 7, line 8, after "The WTRU of claim", delete "2" and insert --1--.

At Claim 25, column 8, line 48, after "of claim", delete "15" and insert --14--.

Signed and Sealed this
Eighth Day of November, 2011

David J. Kappos
*Director of the United States Patent and Trademark Office*